United States Patent
Rein et al.

(10) Patent No.: US 10,255,584 B2
(45) Date of Patent: Apr. 9, 2019

(54) TRACKING NEW SUBMISSIONS FOR AN ONLINE FORMS SERVICE

(75) Inventors: Todd Rein, San Francisco, CA (US); Varun Parmar, San Jose, CA (US); Shannon Hickey, Newmarket (CA); Eylon Stroh, San Carlos, CA (US); Peter Baird, Arlington, MA (US); Brian Havlin, San Jose, CA (US); Subhash Singh Daga, Sunnyvale, CA (US); Roman Dolgov, San Carlos, CA (US)

(73) Assignee: Adobe Inc., San Jose, CA (US)

( * ) Notice: Subject to any disclaimer, the term of this patent is extended or adjusted under 35 U.S.C. 154(b) by 328 days.

(21) Appl. No.: 13/080,296

(22) Filed: Apr. 5, 2011

(65) Prior Publication Data
US 2014/0040718 A1 Feb. 6, 2014

(51) Int. Cl.
*G06F 9/54* (2006.01)
*G06Q 10/10* (2012.01)
*G06F 17/24* (2006.01)

(52) U.S. Cl.
CPC ......... *G06Q 10/103* (2013.01); *G06F 17/243* (2013.01)

(58) Field of Classification Search
CPC ......... H04L 51/24; H04L 51/34; H04L 67/22; G06Q 10/107; G06Q 50/01; G06Q 30/02; G06F 9/546
USPC .......................................... 715/224; 709/206
See application file for complete search history.

(56) References Cited

U.S. PATENT DOCUMENTS

| | | | |
|---|---|---|---|
| 6,732,103 B1 * | 5/2004 | Strick et al. | |
| 7,792,685 B2 | 9/2010 | Andino et al. | |
| 2002/0174050 A1 | 11/2002 | Eynard et al. | |
| 2002/0178041 A1 * | 11/2002 | Krantz | G06Q 10/06314 705/7.18 |
| 2003/0114140 A1 * | 6/2003 | Iivonen et al. | 455/406 |
| 2005/0188320 A1 * | 8/2005 | Bocking | 715/752 |
| 2006/0069734 A1 * | 3/2006 | Gersh et al. | 709/207 |
| 2006/0101035 A1 * | 5/2006 | Mustakallio et al. | 707/100 |
| 2006/0240857 A1 * | 10/2006 | Yoshimachi | 455/518 |
| 2006/0253537 A1 * | 11/2006 | Thomas | 709/206 |
| 2006/0265380 A1 * | 11/2006 | Fry et al. | 707/10 |
| 2008/0147807 A1 * | 6/2008 | Borkenhagen | 709/206 |
| 2009/0132665 A1 * | 5/2009 | Thomsen et al. | 709/206 |
| 2009/0276498 A1 * | 11/2009 | Lyle et al. | 709/206 |
| 2009/0319911 A1 * | 12/2009 | McCann et al. | 715/752 |

(Continued)

FOREIGN PATENT DOCUMENTS

EP 1845487 A2 10/2007

OTHER PUBLICATIONS

Heisler, Tracking responses is vital to your success with direct mail, published Jan. 2002, pp. 1-4.*

(Continued)

*Primary Examiner* — Stephen S Hong
*Assistant Examiner* — Ahamed I Nazar
(74) *Attorney, Agent, or Firm* — Shook, Hardy & Bacon, L.L.P.

(57) ABSTRACT

A method and system to track new submissions for an online forms service is provided. The system may include a request detector to detect a request to load a view (e.g., a web page) and a view provider to provide the view for display in response to the request. The view may comprise submission information for an electronic form and a value indicative of a number of new submissions.

11 Claims, 7 Drawing Sheets

(56) References Cited

U.S. PATENT DOCUMENTS

2010/0318390 A1* 12/2010 Brady ................ G06Q 10/0631
                                                            705/7.23
2011/0086613 A1*  4/2011 Doudkine et al. ............ 455/410
2011/0279851 A1* 11/2011 Berger et al. ................ 358/1.15
2012/0102123 A1*  4/2012 Tysk ............................ 709/206

OTHER PUBLICATIONS

DiGiacomo et al. (Special Edition Using Microsoft Office Outlook 2007, published Dec. 26, 2006, pp. 1-32).*
Outlook_2007_Cornell Information_Apr. 2010, pp. 1-32.*
Outlook Blog—Managing Automatic Meeting Responses_2008, pp. 1-8.*
Outlook 2010—read unread folder items, hereinafter outlook-1, pp. 1.*

* cited by examiner

200

EVENT REGISTRATION FORM

(Please fill out and submit using the "SUBMIT" button at the bottom of the form)

NAME:

SPEAKER/ GUEST

SUBMIT

FORMS

DASHBORD VIEW

| Form name | Total Responses | New Responses |
|---|---|---|
| Event Registration | 6 | 2 |
| Liability Waiver | | |
| | | |
| | | |
| | | |
| | | |

*FIG. 3*

EVENT REGISTRATION RESPONSE TABLE  | 2 |  ─ 402

| | Time submitted | NAME | SPEAKER/GUEST |
|---|---|---|---|
| | March 1, 2011 | John Smith | SPEAKER |
| | March 1, 2011 | Jane Smith | SPEAKER |
| | March 1, 2011 | Ben Moss | SPEAKER |
| | March 1, 2011 | Ben Fran | GUEST |
| | March 1, 2011 | Li Lee | SPEAKER |
| | March 1, 2011 | Joseph Kennedy | GUEST |

*FIG. 4*

TRACKING NEW SUBMISSIONS FOR AN ONLINE FORMS SERVICE

TECHNICAL FIELD

This disclosure relates generally to the technical fields of software and/or hardware technology and, in one example embodiment, to system and method for tracking new submissions of an electronic form.

BACKGROUND

Many documents are generated in today's electronic society. An electronic document, e.g., an electronic event registration form, may be authored by one individual (e.g., using an authoring program hosted by a computer system) and then filled out and submitted, by others, to a collecting computer system. Some existing products offer a comprehensive architecture for electronic document creation, collaboration, and process management. In the context of such architecture, a user may initiate a computer-implemented workflow by distributing an electronic form to a group of participants via a network communication and then be able to collect, electronically, the filled-out forms from the workflow participants. The participants, in turn, may fill out the form and then submit the filled-out form to the collecting computer system. A user (e.g., an administrator) may wish to keep track of the received filled-out electronic forms, but may not have a clear indication from the collecting computer system whether any new filled-out forms have been received since the administrator last viewed information related to the received filled-out forms.

BRIEF DESCRIPTION OF DRAWINGS

Embodiments are illustrated by way of example and not limitation in the figures of the accompanying drawings, in which like references indicate similar elements and in which:

FIG. 2 illustrates an example view of an event registration form, for which submissions may be monitored by the system for tracking new submissions shown in FIG. 1;

FIG. 3 illustrates an example dashboard view showing information regarding new submissions of the event registration form shown in FIG. 2;

FIG. 4 illustrates an example response table view showing user-supplied information obtained from submissions of the event registration form shown in FIG. 2;

DETAILED DESCRIPTION

Figure 1:
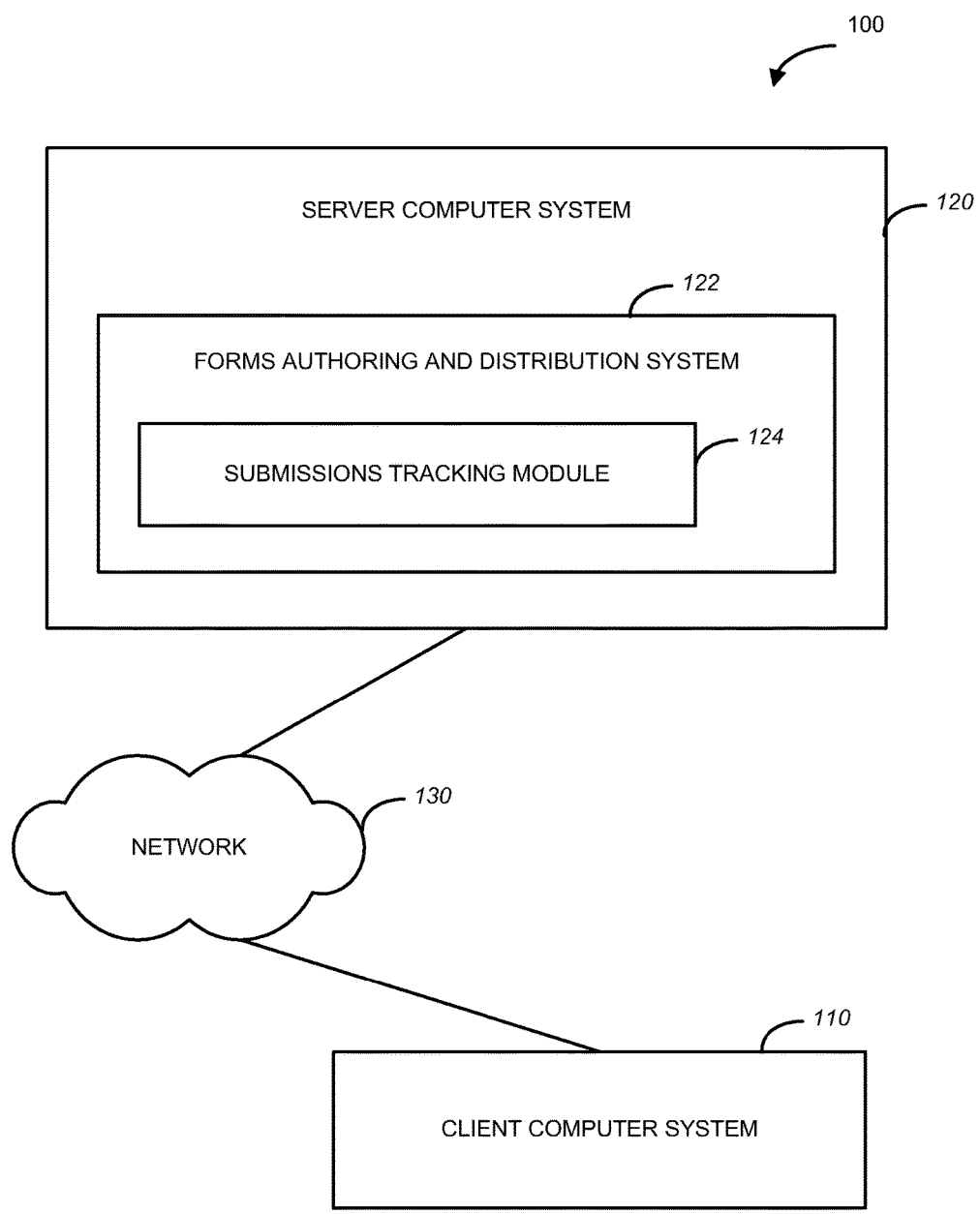
FIG. 1 shows a network environment within which a method and system for tracking new submissions of an electronic form is implemented, in accordance with an example embodiment.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Method and system are described that permit tracking new received filled-out electronic forms. In one embodiment, the system is configured to provide, within one or more electronic views related the received filled-out electronic forms, an indication of how many new submissions have arrived since the user last viewed the received filled-out electronic forms. The system may also be configured to highlight previously unviewed submissions. The phrase "electronic form" will be understood as encompassing any electronic media content intended to be used in either an electronic form or as printed output. An electronic form may, in many cases, embody a complex "application packaged as a document" that may utilize a template-based grammar where the template associated with an electronic form defines presentation, calculations and interaction rules, while the content of the electronic form comprises the application data of the user. For the purposes of this description, the terms "electronic form" and "form" are used interchangeably.

An electronic form may be authored, e.g., using an on-line forms authoring and distribution service, in order to collect information from multiple users. For example, when event registration information needs to be collected from a number of prospective event participants, an electronic event registration form may be created and distributed to the prospective participants. An electronic form may have built-in submit functionality, such that a user may be able to submit the filled-out form merely by invoking a submit control button presented on the form. The submitted filled-out form (also termed a form submission or a submission of an electronic form) may be processed at a computer-implemented form-submission center that may also be termed a system for tracking new submissions of an electronic form. A system for tracking new submissions of an electronic form may be provided as part of a forms authoring and distribution service. Alternatively, a system for tracking new submissions of an electronic form may be provided as a service that is separate from the form authoring and distribution system.

The submitted filled-out forms may be collected at a pre-determined repository. The user-provided data in the submitted forms may be aggregated into an electronic view that can be presented to and viewed by an administrator or by multiple users, e.g., an administrator and his manager. In order to track new submissions of an electronic form, an example system may be configured to maintain a counter reflecting the total number of submissions and also a counter associated with a user reflecting the number of submissions that has been seen by that user. The counter reflecting the number of submissions that has been seen by a particular user may be termed a last seen counter. The counter reflecting the total number of submissions and the last seen counter may be used to generate a value reflecting how many new submissions have been received since the user last viewed the submissions.

While the system may maintain a single counter that indicates the total number of submissions, the system may be configured to maintain a separate last seen counter for each user. For example, in a use-case where an administrator and his manager both may view received submissions of an electronic form—e.g., the administrator monitoring arrival of new submissions more frequently than the manager—one last seen counter may be maintained as associated with the identification of the administrator and another last seen counter may be maintained as associated with the identification of the manager.

Example method and system to track new submissions of an electronic form may be implemented in the context of a network environment 100 illustrated in FIG. 1. As shown in FIG. 1, a server computer system 120 hosts a forms authoring and distribution system 122 that includes a submissions tracking module 124. While FIG. 1 shows the submissions tracking module 124 as provided with the forms authoring and distribution system 122, the submissions tracking module 124 may be decoupled from the forms authoring and distribution system 122 and may execute on a different computer system, independent from the forms authoring and distribution system 122.

In one embodiment, the forms authoring and distribution system 122 is implemented as a web application that provides an online forms authoring and distribution services that can be accessed by users via a browser application, e.g., a browser application hosted at a client computer system 110. The client computer system 110 communicates with the server computer system 120 via a communication network 130. The communication network 130 may be a public network (e.g., the Internet, a wireless network, etc.) or a private network (e.g., LAN, WAN, Intranet, etc.).

While the forms authoring and distribution system 122 may be configured to permit a user to create (to author) an electronic form and distribute it to one or more destinations associated with respective form recipients, the submissions tracking module 124 may be configured to detect form submissions from the recipients and process, store, or present for viewing the collected form submissions. For example, a user may author an event registration form, such as, e.g., a form 200 shown in FIG. 2. The event registration form 200 can be distributed to potential event attendees, e.g., in order to compile a list of attendees' names. An authored electronic form often includes one or more form fields that can be used by recipients to fill in the requested information. An electronic form augmented with user-provided information (such as, e.g., the event registration form 200 filled out and submitted by a recipient) may be referred to as a submission of the electronic form.

Submissions of an electronic form or user data associated with the submissions may be presented to an administrator for viewing. In one embodiment, the submissions tracking module 124 of FIG. 1 may be configured to present the administrator with information regarding how many new submissions have been detected since the administrator last viewed the received submissions. A value representing the number of yet unviewed submissions may be shown on various views provided by the submissions tracking module 124 of FIG. 2, e.g., on a view 300 shown in FIG. 3 and on a view 400 shown on FIG. 4.

The view 300 of FIG. 3 merely shows the identification (e.g., the file name) of an electronic form, the value indicating the total number of submissions of the form, and the value indicating how many new submissions have been detected by the submissions tracking module 124 of FIG. 2 since the user-provided data associated with the submissions have been presented to the administrator. The view 400 of FIG. 4, which may be referred to as a "Response Table" or a response table view, shows, in addition to the identification of the electronic form and the value indicating many new submissions have been detected since the user-provided data associated with the submissions have been presented to the administrator, user data provided with each submission of the event registration form 200.

As shown in FIG. 4, the view 400 displays the title of the electronic form ("Event Registration") and the number of new submissions of the "Event Registration" form in area 402. In some embodiments, the view 400 may also visually distinguish records associated with new submissions of the electronic form. For example, as shown in FIG. 4, a dot is displayed next to each of two top-most records in the list of records, indicating that record 404 and record 406 are associated with two new submissions that have not been previously presented for viewing.

Figure 5:
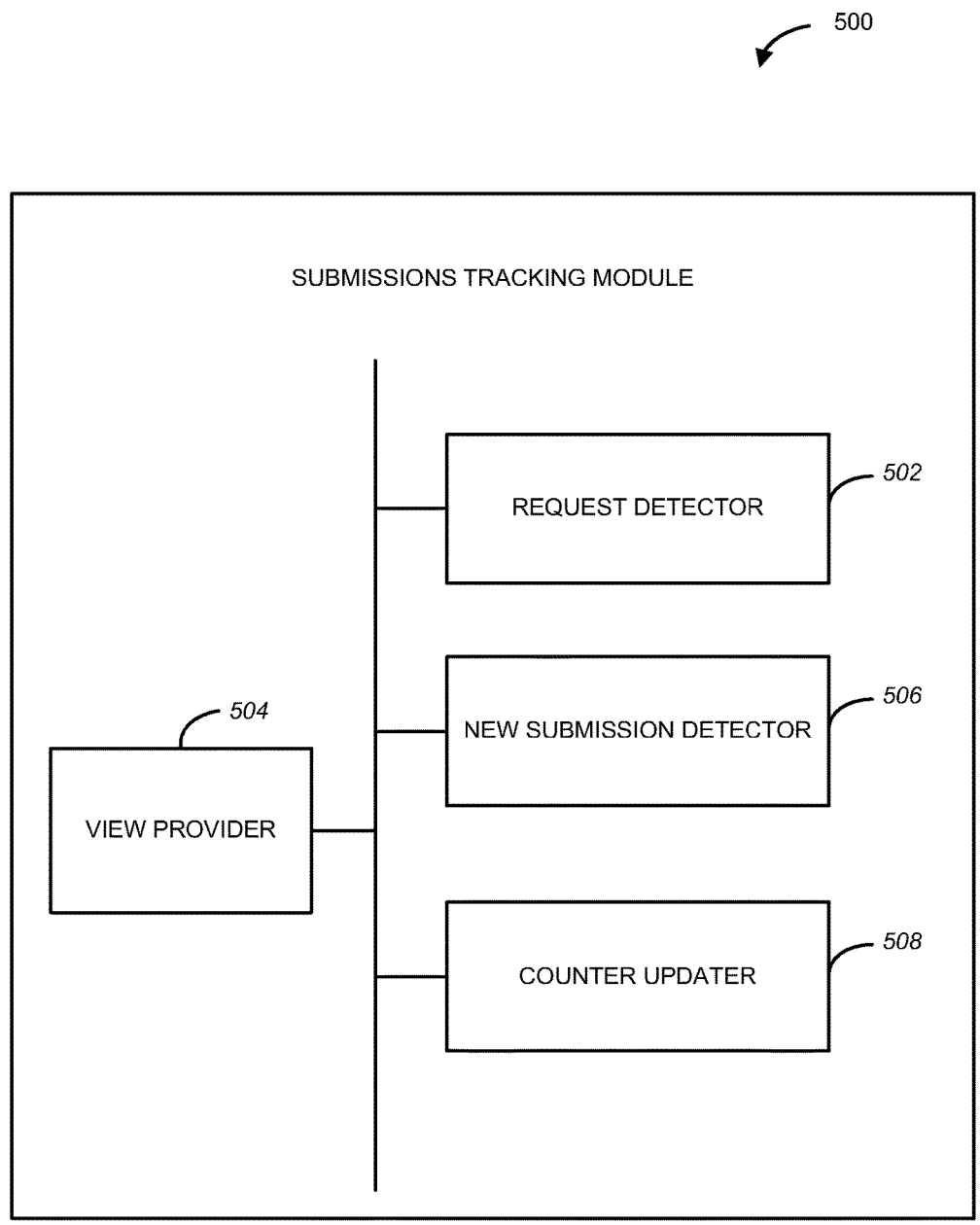
FIG. 5 is a block diagram illustrating a system for tracking new submissions of an electronic form that may be utilized within the network environment shown in FIG. 1, in accordance with an example embodiment.

FIG. 5 is a block diagram illustrating a system 500 for tracking new submissions of an electronic form. In one example embodiment, the system 500 for tracking new submissions of an electronic form may be associated with an online forms authoring and distribution service and may correspond to the submissions tracking module 124 of FIG. 1. Each of the modules of the system 500 may be implemented utilizing at least one processor.

As shown in FIG. 5, the system 500 includes a request detector 502 and a view provider 504. The request detector 502 may be configured to detect a request to load a view (e.g., a web page) that presents submission information for an electronic form. The request to load a view may be submitted via a user interface presented at a computer system, e.g., via a browser application executing at the client computer system 110. Some examples of the requested view are illustrated in FIGS. 3 and 4. The view provider 50 may be configured to provide the requested view for display in response to the request. As discussed above, with reference to FIGS. 3 and 4, the requested view may display a value indicative of a number of new submissions. A submission of an electronic form may be regarded by the system 500 to be a new submission if the user-supplied data provided with the submission has not been presented to a viewer for viewing.

In one example embodiment, the system 500 comprises a new submission detector 506 configured to detect new submissions of the electronic form. The system 500 may also include a counter updater 508 to update a submissions counter responsive to a new submission. A submissions counter may be associated with a particular electronic form and may be incremented each time a submission of the electronic form is detected.

A submissions counter, in one embodiment, may store the value indicative of the total number of submissions of the electronic form. The system 500, in this embodiment, may include a module (not shown in FIG. 5) to maintain a last seen counter to store the value that equals a number of submissions of the electronic form that have been presented for viewing. The last seen counter is maintained per user, such that if one user has viewed all received submissions, the last seen counter associated with that user is updated, but the last seen counter associated with another user, who may not have seen all currently viewable submissions, is not updated until that user views the list of submissions. The view provider 504 may be configured to calculate the value indicative of a number of new submissions by subtracting a value that equals a number of submissions of the electronic form that have been presented for viewing from the total number of submissions of the electronic form. En example table illustrating this calculation is shown below in Table 4.

TABLE 4

|  | A<br>Global<br>counter | B<br>Last counter user<br>saw | C<br>New response<br>count for user<br>(=a − b) |
|---|---|---|---|
| No submissions | 0 | 0 | 0 |
| Submission (author not logged in) | 1 | 0 | 1 |
| Submission (author not logged in) | 2 | 0 | 2 |
| Author logs in - reset last seen user counter | 2 | 2 | 0 |
| Submission (author not logged in) | 3 | 2 | 1 |

Using the example described with reference to FIG. 2-4, the response table view associated with the "Event Registration" form displays user-supplied registration information—the user's name and the user's designation as a guest or a speaker. When the view provider 504 provides the response table view associated with the "Event Registration" form to the client computer system 110 (controlled, e.g., by a first administrator), all of the submissions of the "Event Registration" form are considered by the system 500 as having been viewed by the first administrator and the last seen counter associated with the user identification of the first administrator is updated. The last seen counter associated with the user identification of the first administrator is not updated, however, if the view associated with the submissions of the electronic form that is provided to a viewing application controlled by the first administrator does not display user-supplied information (such as, e.g., the view 300 of FIG. 3).

Figure 6:
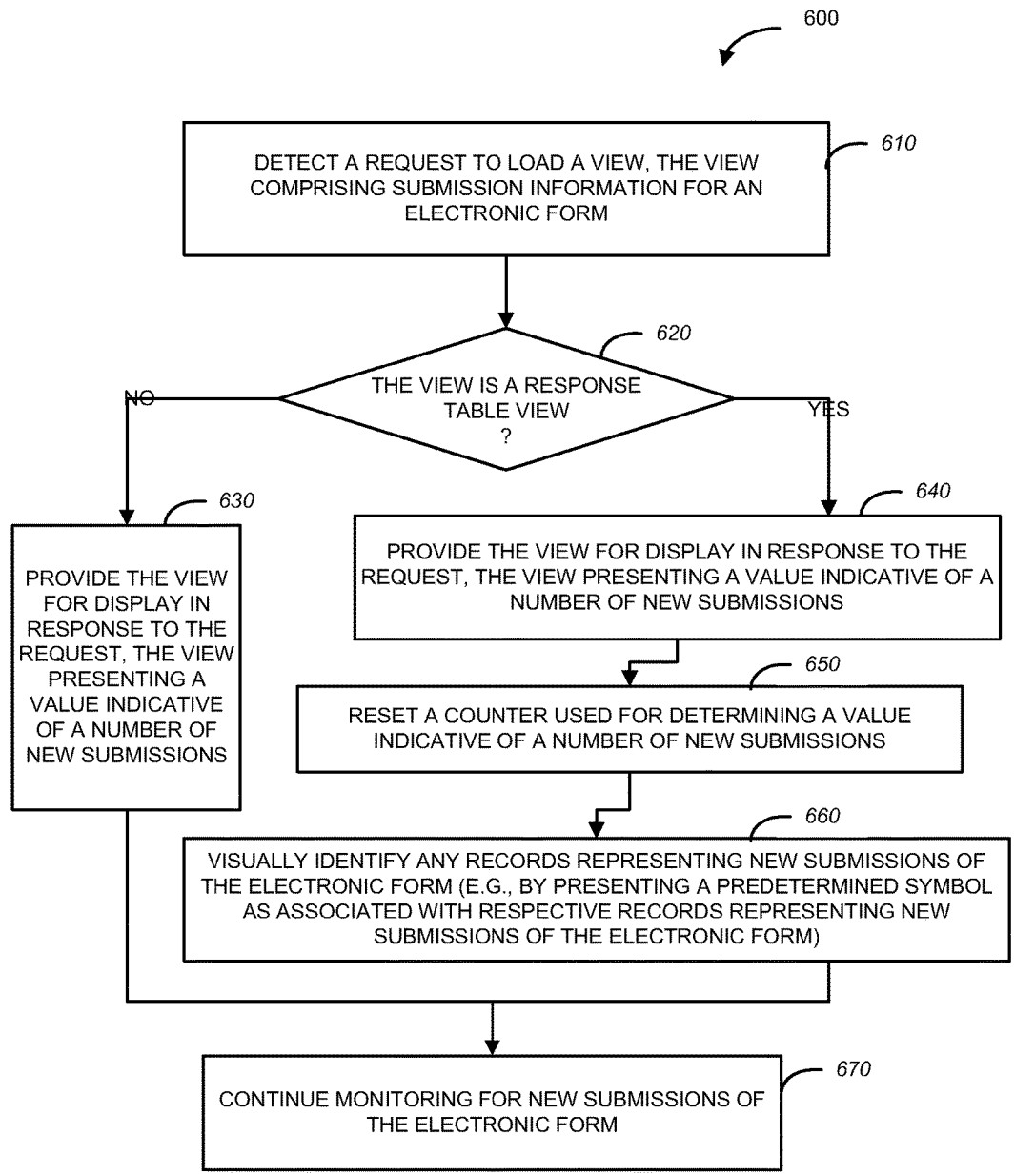
FIG. 6 is a flow chart illustrating a method that may be performed by the system for tracking new submissions shown in FIG. 1, in accordance with an example embodiment.

FIG. 6 is a flow chart illustrating a method 600 for tracking new submissions of an electronic form, in accordance with an example embodiment. The method 600 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server computer system 120 of FIG. 1 and, specifically, at the system 500 shown in FIG. 5.

As shown in FIG. 6, the method 600 commences at operation 610 when the request detector 502 of FIG. 5 detects a request to load a view, the view comprising submission information for an electronic form. The request may be submitted via a user interface presented at the client computer system 110 of FIG. 1. At operation 630 (and also at operation 640, the view provider 504 of FIG. 5 provides the requested view for display (e.g., to a browser application executing at the client computer system 110) in response to the request. The view being provided by the view provider 504 presents a value indicative of a number of new submissions of the electronic form with respect to the requesting user.

If the requested view includes user-supplied data associated with the electronic form (e.g., if the requested and provided view is the "Response Table" illustrated in FIG. 4), which may be determined at operation 620, the counter updater 508 of FIG. 5 updates, at operation 650, the counter that is maintained by the system 500 and is used for determining the value indicative of a number of new (yet unviewed) submissions of the electronic form. As explained above, the counter that is used for determining the value indicative of a number of new submissions of the electronic form may be a last seen counter to store the value that equals a number of submissions of the electronic form that have been presented for viewing to the user.

At operation 660, any records representing new submissions of the electronic form are visually identified by presenting a predetermined symbol as associated with respective records representing new submissions of the electronic form. In one embodiment each received submission is assigned a numeric count value, termed a response count, as it arrives; this count value is determined by retrieving the value of the submissions counter and incrementing it. Then, when a response table (e.g., the view 400 shown in FIG. 4) is being displayed to a user, the response count for a particular submission is compared to the last seen counter associated with the identification of the user. If the response count is greater than the last seen counter, the associated record in the response table is marked as new.

For example, suppose the submissions counter associated with an electronic form is 10. The last seen counter associated with an identification of a user is 10. When a new submission of the electronic form is detected, the submissions counter is incremented to 11 and the response count associated with the detected submission is assigned the value 11. When another new submission of the electronic form is detected, the submissions counter is incremented to 12 and the response count associated with the detected submission is assigned the value 12. When a response table associated with the electronic form (e.g., the view 400 shown in FIG. 4) is presented to a user, the displayed value indicating the number of new submissions is 2; the submissions that have response values that are greater than 10 (the submissions that have response values 11 and 12 in this example) are shown as new (e.g., by displaying a dot next to an associated record in the table). Submissions that have response values that are less than or equal to 10 are not shown as new. If a new submission is detected while the response table is being presented to the user, the submissions counter is incremented to 13 and the newly-detected submission is assigned a response count having the value 13. As the response value associated with this newly-detected submission (13) is greater than the value of the last seen counter (10), this new submission is shown as new in the response table.

The value of the last seen counter is reset to the value of the submissions counter only after the response table associated with the electronic form has been provided to the user for viewing (e.g., after the response table has been displayed and the viewing has been completed). Responsive to a determination that the user completed the viewing of the response table (e.g., the user navigated away from the web page displaying the response table), the next time the user requests to view the dashboard view or in the response table view, the displayed value indicating the number of new submissions is 0 (if no subsequent submissions have been received). The monitoring for new submissions of the electronic form is continued at operation 670.

Figure 7:
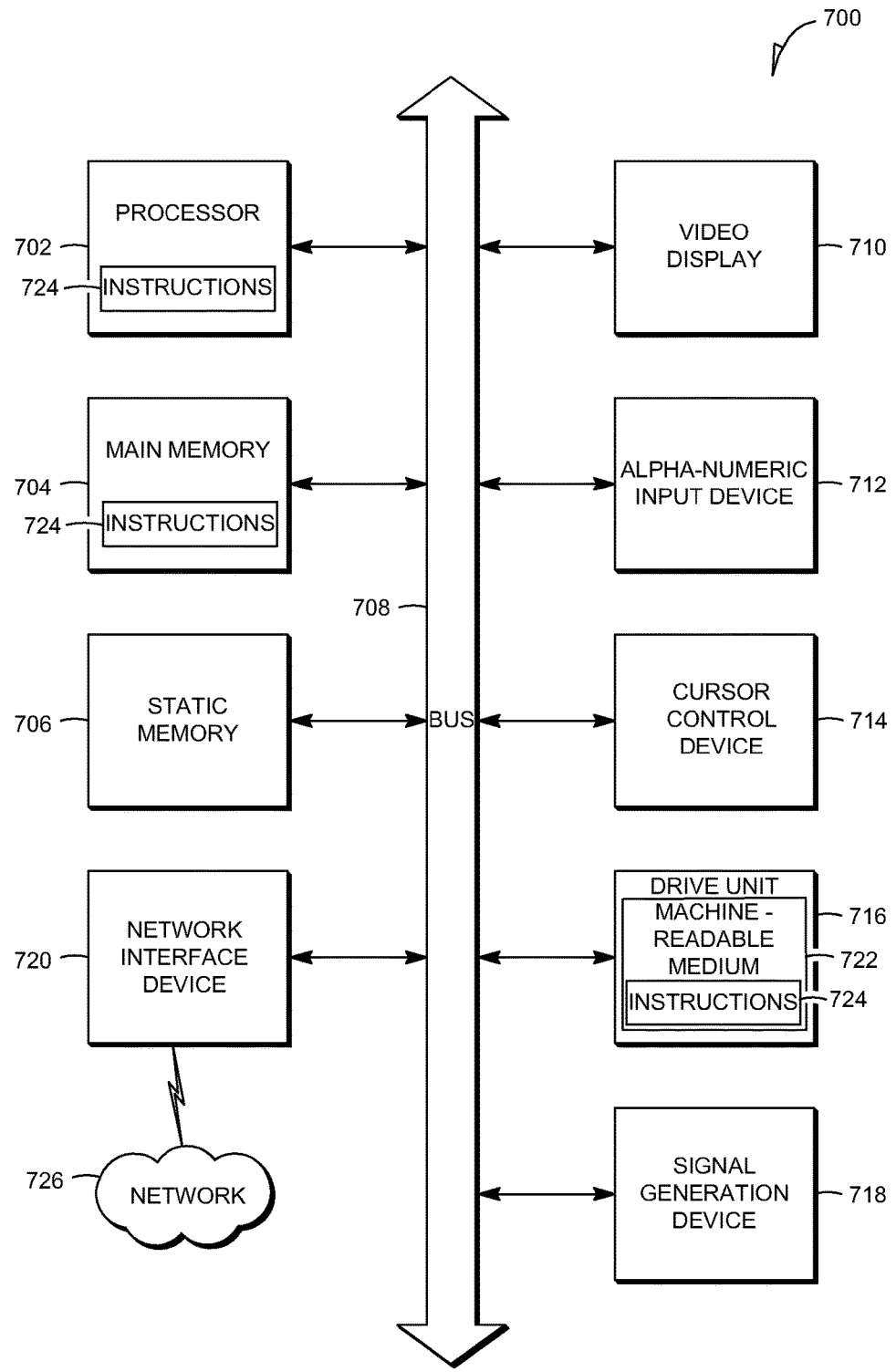
FIG. 7 illustrates a diagrammatic representation of a machine in the example form of a computer system within which a set of instructions, for causing the machine to perform any one or more of the methodologies illustrated in accordance with FIG. 1-6 related to tracking new submissions of an electronic form may be executed.

FIG. 7 shows a diagrammatic representation of a machine in the example form of a computer system 700 within which a set of instructions, for causing the machine to perform any one or more of the methodologies related to tracking new submissions of an electronic form may be executed, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, method and system for tracking new submissions of an electronic form have been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A computer-implemented method comprising:
   detecting, using at least one processor, a request to load a view that includes information identifying multiple submissions of a plurality of electronic forms, a submission of each electronic form of the plurality of electronic forms including an instance of the electronic form augmented with data provided by a user;
   tracking a number of new submissions of each of the electronic forms of the plurality of electronic forms using a submission counter that is separate from other counters, a new submission being a submission of the electronic form received via a communications network that includes user-supplied data not previously presented by a computer system for viewing; and
   in response to the request, providing the view for display, the view presenting both a first value indicative of only the number of new submissions of each of the electronic forms of the plurality of electronic forms and a second value indicative of a total number of submissions of each of the electronic forms of the plurality of electronic forms, where both the first value and the second value are individually provided for each of the electronic forms of the plurality of electronic forms.

2. The method of claim 1, comprising:
detecting a new submission of the electronic form; and
in response to the detecting of the new submission, updating a submissions counter.

3. The method of claim 2, comprising calculating a value indicative of the number of new submissions by subtracting a value that equals a number of submissions of the electronic form that have been presented for viewing by the computing system from a total number of submissions of the electronic form, wherein the submissions counter is to store the value that equals the total number of submissions of the electronic form.

4. The method of claim 2, wherein the providing of the view for display comprises providing a response table view, the response table view comprising one or more records displaying user-supplied information associated with respective submissions of the electronic form.

5. The method of claim 4, wherein the providing of the response table view, comprises visually identifying any records representing new submissions of the electronic form.

6. The method of claim 4, wherein the response table view visually identifies any records representing new submissions of the electronic form by presenting a predetermined symbol as associated with respective records representing new submissions of the electronic form.

7. The method of claim 4, comprising maintaining a last seen counter to store a value that equals a number of submissions of the electronic form that have been presented for viewing.

8. The method of claim 7, wherein the maintaining of the last seen counter is on a per-user basis.

9. The method of claim 8, comprising updating the last seen counter in response to the providing of the response table view.

10. The method of claim 7, comprising:
presenting a dashboard view that includes a value indicative of a number of new submissions of the electronic form, the view lacks user-supplied information associated with respective submissions of the electronic form; and
in response to the presenting of the dashboard view that lacks user-supplied information associated with respective submissions of the electronic form, refraining from updating of the last seen counter.

11. A machine-readable non-transitory medium having instruction data to cause a machine to:
detect a request to load a view that includes information identifying multiple submissions of an electronic form, a submission of the electronic form including an instance of the electronic form augmented with data provided by a user;
track a number of new submissions of the electronic form using a submission counter that is separate from other counters, a new submission being a submission of the electronic form received via a communications network that includes data provided by one or more users in the electronic form not previously presented by a computer system for viewing;
in response to the request, provide the view for display, the view presenting a value indicative of the number of new submissions of the electronic form;
determine that the view includes data provided by the one or more users in the electronic form, wherein only views including data provided by the one or more users in the electronic form trigger a reset of the submission counter;
upon determining that the view includes data provided by the one or more users in the electronic form, reset the submission counter indicating the number of new submissions of the electronic form;
monitor for subsequent new submissions of the electronic form.

* * * * *